Patented Nov. 28, 1933

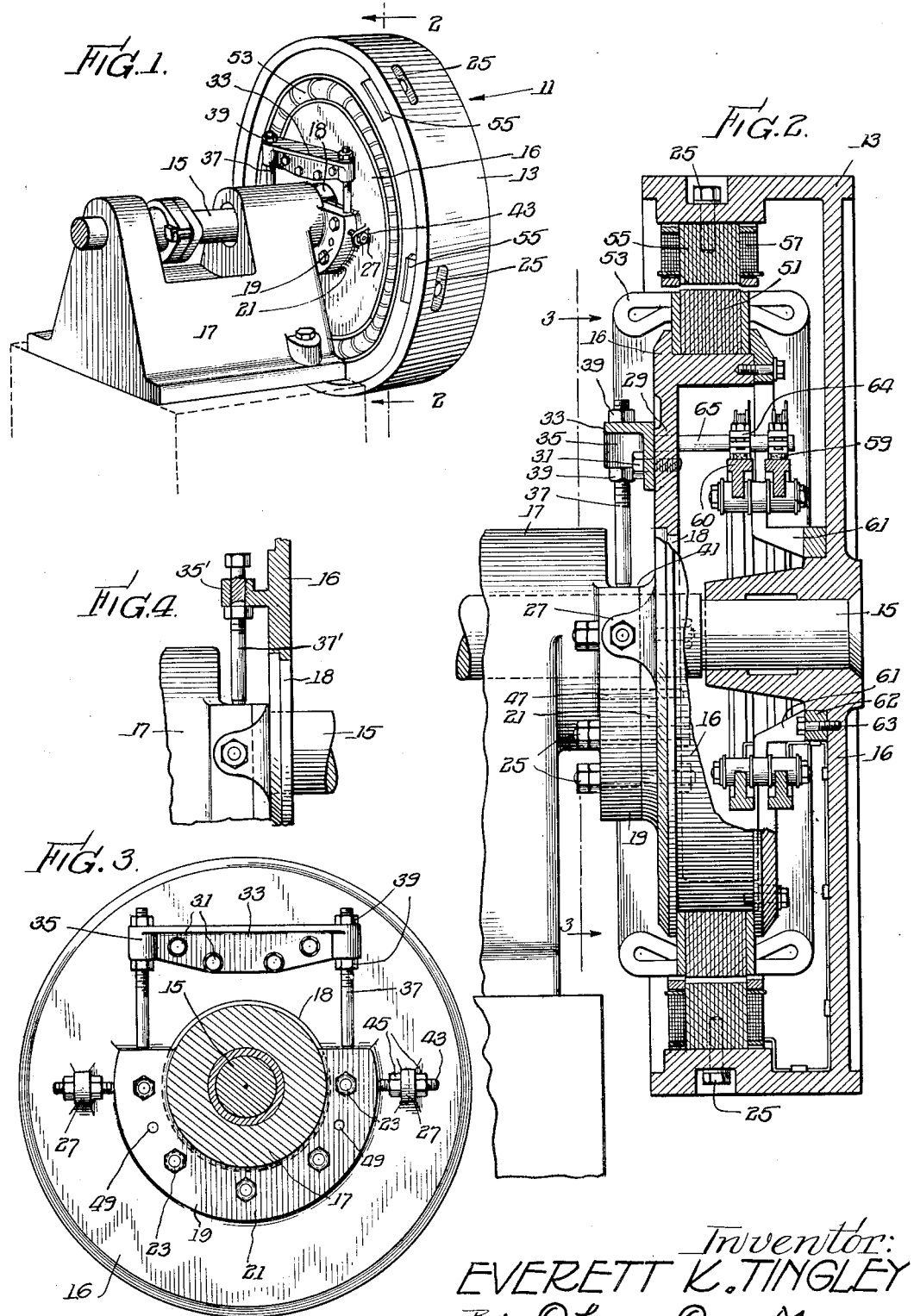

1,936,737

UNITED STATES PATENT OFFICE 1,936,737

ADJUSTABLE AIR GAP FLY WHEEL TYPE MOTOR

Everett K. Tingley, Mansfield, Ohio, assignor to Ideal Electric & Manufacturing Co., Mansfield, Ohio, a corporation of Ohio Application September 5, 1931. Serial No. 561,464

5 Claims. (Cl. 171—252)

My present invention relates in general to adjustable devices and has more particular reference to novel means for and method of adjusting the clearance between a rotating member and the frame with respect to which it rotates. More particularly, my invention relates to adjusting the air gap between the rotor and stator of an alternator, more specifically a fly-wheel type alternator of the type illustrated and described in the Schou Patent, 1,736,551, issued November 19, 1929.

One of the important objects of my present invention is to provide an accurate and easily manipulated device for adjusting and equalizing the clearance between a rotating element such as the rotor of an alternating current generator and the stationary member across which the rotor moves. In electrical machinery, this clearance is the air gap which has to be substantially constant at all points in order to promote satisfactory operation of the device. Variations in the air gap of an electrical motor or generator change the intensity of the magnetic field and impair the operating characteristics of the device, which requires a uniform field intensity at all parts of the air gap for most satisfactory operation.

Another important object therefore is to provide means for adjusting the air gap in an electrical motor or generator or similar device.

Another important object resides in providing a simple, inexpensive and readily adjustable means for adjusting the stator or relatively stationary portion of a machine having relatively rotatable parts in order to true up the clearance between the relatively moving parts.

Another important object is to provide means for adjusting the air gap of a fly-wheel alternator.

Numerous other objects and advantages will appear as the invention is more fully understood from the following description, which taken in connection with the accompanying drawing, discloses a preferred embodiment of the invention.

Referring to the drawing:

Figure 1 is a perspective view illustrating a fly-wheel alternator, the fly-wheel or rotatable portion of which is mounted on a shaft journalled in a pedestal bearing to which the stator or stationary portion of the machine is also attached;

Figure 2 is a vertical section taken substantially along the line 2—2 in Figure 1;

Figure 3 is a vertical section taken substantially along the line 3—3 in Figure 2; and Figure 4 is a fragmentary view illustrating a modified construction of the part of the assembly illustrated in Figure 2.

To illustrate my invention, I have shown a fly-wheel type alternating current motor or generator 11 comprising a fly-wheel 13 carried on a shaft 15, which in turn is journaled in a bearing 17, the shaft extending outwardly of the end of the bearing and carrying the fly-wheel 13 on its projecting end.

Heretofore, it has been customary to place the rotor of an alternating current generator inside of the stator and this necessitates the provision of a firm foundation for the stator which encircles the rotor. In such a construction, the diameter of the armature, which determines the fly-wheel effect of the rotating element, is limited by the internal bore of the stator. The space, which the armature field windings occupy, is considerably limited. Numerous other considerations also demonstrate the advantage of employing a fly-wheel type of machine in which the rotor is arranged outside of the stator to increase the fly-wheel effect and to provide extra space for the field windings.

I have therefore shown in the drawing, in order to illustrate my present invention, a device in which the stator 16 is placed within the rotor which overhangs the stator. By this arrangement, the weight of the rotor is carried outwardly away from the shaft 15 on which it is supported so that it is most effective as a fly-wheel and the same fly-wheel effect can be obtained in a considerably smaller device than is possible with the ordinary construction. Of course, the means for adjusting the air gap is not necessarily limited to the particular construction illustrated, although my invention has more particular reference to the fly-wheel type of dynamo motor.

In the device illustrated, the stator parts are all enclosed substantially within the zone of the fly-wheel 13 and the outer surface of the fly-wheel is left smooth and unobstructed so that it can be used as a face of a driving pulley when the device is employed as a generator or may be used to furnish power to a belt when used as a motor. The frame of the stator 16 is suspended from an aligning plate or seat 19 formed integrally in the pedestal of the bearing 17, the shaft 15 passing through an opening 18 in the stator frame. The plate 19, being preferably formed directly on the pedestal of the bearing carrying the rotor shaft 15, accurately locates the stator relatively to the rotor to ensure a proper air gap between the parts.

In prior constructions, it has been the practice to adjust the air gap between the rotor and stator where the machine is erected by shimming the stator to obtain vertical alignment of the parts and shifting the stator horizontally in order to get an equal gap on each side of the armature.

In the present invention, the relative position of the rotor and stator is completely determined by the bracket or plate 19 independently of the foundation on which the device is erected and consequently can be accurately fixed in the factory before the machine is sent out for erection.

The stator is formed with a preferably integral plate portion or boss 21 at the edge of the opening 18, said boss having a bearing surface adapted to engage the surface of the bracket 19. This boss and the bracket 19 have registering perforations 23 for receiving fastening members 25, comprising bolts for securing the boss 21 to the aligning bracket 19 of the bearing pedestal. The perforations of the bracket or plate 19 preferably snugly receive the bolts 25 while the corresponding perforations of the boss 21 have a certain tolerance whereby to permit the boss to shift slightly in every radial direction with respect to the bracket 19.

The stator 16 also has outstanding arm portions 27 extending around and overlying the side edges of the bracket 19. The stator 16 is also provided with means forming a seat 29 to which is fastened, as by the bolts 31, a frame 33 of angle iron construction, the opposite ends of which are provided with vertical sleeves 35 adapted to receive the threaded rods 37, the upper ends of which extend through the sleeves 35 and carry adjusting nuts 39 threaded thereon above and below the sleeves. The lower ends of the rods are adapted to rest upon the upper flat surface 41 of the plate portion 19 so that by turning the adjusting nuts 38, the stator may be adjusted vertically in respect to the cradle. The arms 27, which are formed on the portion 21 of the stator, are also formed to slidably receive threaded studs 43, which carry adjusting nuts 45 threaded thereon on either side of the arms 27.

The inner ends of these studs 43 engage the opposite sides of the plate member 19 so that by adjusting the nuts 45, the stator may be shifted laterally with respect to the plate portion of the bearing pedestal. If desired, the angle iron bracket 33 may be formed integral with the stator spider and the studs 37 may be threaded into the sleeve portion 35 and, instead of the adjusting nuts 39, the stud may be provided with a head and a locking nut as illustrated in Figure 4 of the drawing.

The adjusting means carried by the arms 27, may also be similarly modified if desired.

After the stator has been accurately adjusted within the rotor, dowel pins 47 may be inserted after the parts 19 and 21 have been suitably drilled as indicated at 49, and the fastening members 25 bolted up tight. All this may, of course, be accomplished at the factory and the device may be shipped out for erection without the adjusting devices, it being only necessary in assembling the device to line up the drilled dowel pin perforations in the parts 19 and 21, insert the dowel pins to accurately align the parts and tighten the fastening members 25.

The stator and fly-wheel 17 may be provided with suitable windings and laminations of any desired or preferred construction and I have shown the stator as being provided with laminations 51 and suitable windings 53 for producing the rotating fields of a synchronous machine. Laminated pole pieces 55 are also secured to the inner surface of the rim of the fly-wheel by means of bolts 25, the heads of which are preferably countersunk below the inner surface of the fly-wheel.

Bars, to constitute squirrel cage windings for the purpose of starting the device, such as an induction motor and excitation windings 57 for the pole pieces 55 are or may be supplied with direct current by means of suitable brushes 59 which bear on slip rings 60 carried by a bracket 61 secured to the fly-wheel 17 by bolts 63. The brushes 59 are carried by brush holders 64 supported on a pin 65 carried by the stator spider.

It is thought that the invention and numerous of its attendant advantages will be understood from the foregoing description, and it is obvious that numerous changes may be made in the form, construction and arrangement of the several parts without departing from the spirit or scope of my invention or sacrificing any of its attendent advantages and I do not wish to limit the invention to the particular construction described except as directed in the appended claims.

Having thus described my invention, what I claim as new and desire to secure by Letters Patent is as follows:

1. In an electrical machine, a base, a fly-wheel rotor rotatably mounted on said base, means forming a bracket on said base, an internally disposed stator mounted on said bracket and extending substantially within the zone of said fly-wheel rotor, and adjustable means carried by said stator and co-operating with said bracket of said base to adjustably shift the stator on said bracket whereby to align the stator within the rotor and to adjust the clearance between the stator and rotor and means to secure the stator in aligned position on said bracket.

2. In an electrical machine, a base, a fly-wheel rotor mounted for rotation on said base, means forming a bracket on said base, a stator mounted on said bracket and extending substantially within the zone of said fly-wheel rotor, adjustable means cooperatively associated with and coacting between said stator and said bracket to adjustably shift the stator with respect to said bracket in order to align the stator with respect to said bracket in order to align the stator within the rotor or and to adjust the clearance between the stator and rotor, and means to secure the stator in aligned position on said bracket, said adjustable means being carried in a bracket demountably attached on said stator.

3. In an electrical machine, a base, a fly-wheel rotor mounted for rotation in said base, means forming a bracket part on said base and a stator part mounted on said bracket and extending substantially within the zone of said fly-wheel rotor, and adjustable means cooperatively associated between said stator part and said bracket part, said adjustable means being carried by one of said parts and having a cooperative connection with the other part whereby to adjust the stator part on said bracket part in order to align the stator part within the rotor and to adjust the clearance between the stator part and the rotor, and means to secure the stator part in aligned position on said bracket.

4. In an electric machine, a base, a fly-wheel rotor mounted for rotation in said base, means forming a bracket part on said base, and a stator part mounted on said bracket and extending substantially within the zone of said fly-wheel rotor, and adjustable means cooperatively associated between said stator part and said bracket part, said adjustable means being carried by one of said parts and having a threaded connection with one of said parts and being operatively connected with the other part whereby to adjust the stator part on said bracket part in order to align the stator part within the rotor and to adjust the clearance between the stator part and the rotor, and means to secure the stator part in aligned position on said bracket.

5. In an electric machine, a base, a fly-wheel rotor mounted for rotation on said base, means forming a bracket on said base, a stator mounted on said bracket and extending substantially within the zone of said fly-wheel rotor and adjustable means carried by and threadedly connected to said stator and cooperatively associated with said bracket to adjustably shift the stator with respect to said bracket in order to align the stator within the rotor and to adjust the clearance between the stator and rotor and means to secure the stator in aligned position on said bracket.

EVERETT K. TINGLEY.